(No Model.)
W. LAWRENCE.
SUPPLY SYSTEM FOR ELECTRIC RAILWAYS.
No. 538,838. Patented May 7, 1895.
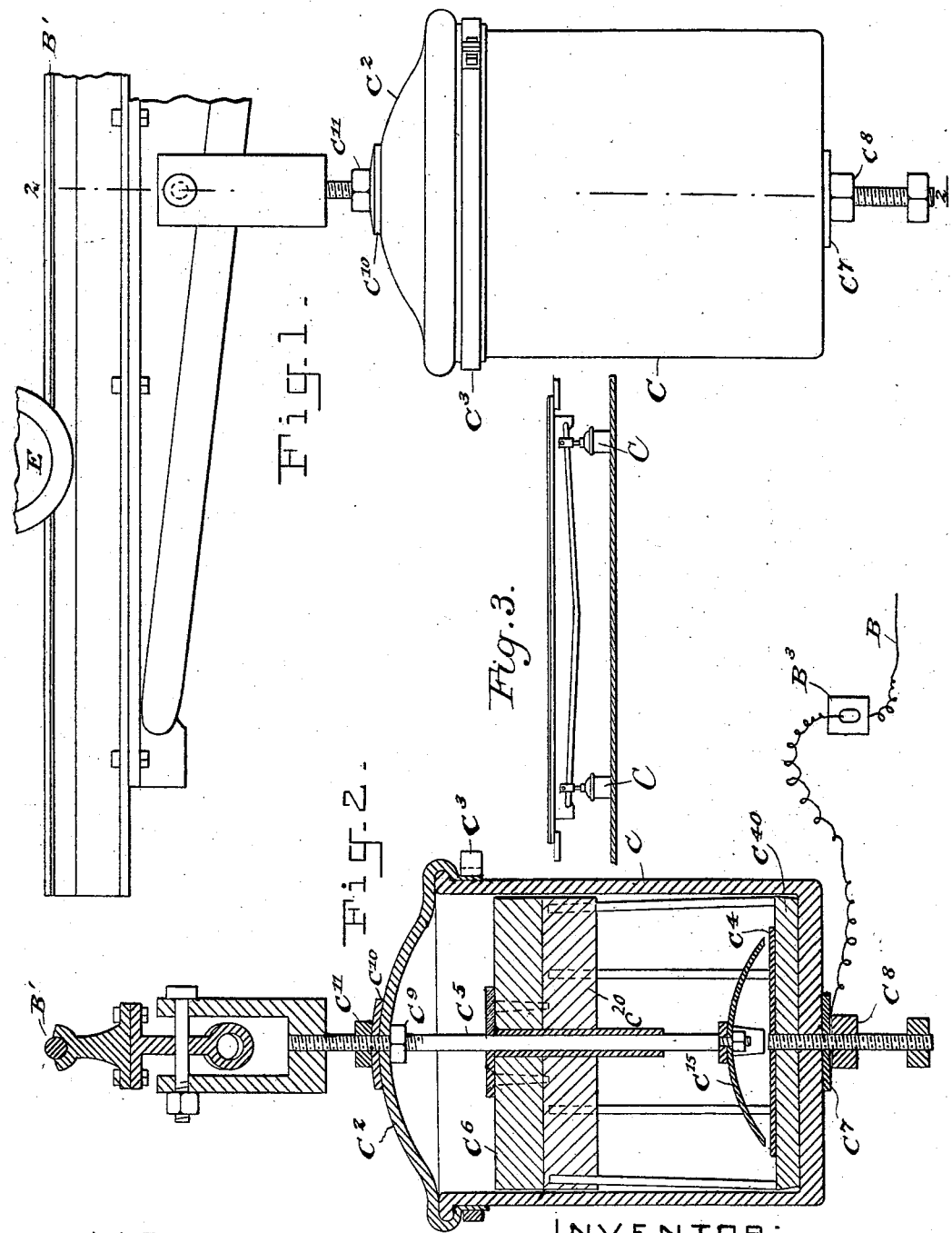
WITNESSES:
E. B. Bolton
N. F. Mead
INVENTOR:
Wm Lawrence
By J. O. Fowler Jr.
his Attorneys.

UNITED STATES PATENT OFFICE.

WILLIAM LAWRENCE, OF NEW YORK, N. Y., ASSIGNOR TO THE LAWRENCE ELECTRIC COMPANY, OF SAME PLACE.

SUPPLY SYSTEM FOR ELECTRIC RAILWAYS.

SPECIFICATION forming part of Letters Patent No. 538,838, dated May 7, 1895.

Application filed April 28, 1894. Serial No. 509,416. (No model.)

*To all whom it may concern:*

Be it known that I, WILLIAM LAWRENCE, a citizen of the United States, and a resident of New York, in the county and State of New York, have invented a certain new and useful Water and Air Tight Junction Box, of which the following is a specification.

My invention relates to a junction box for an underground conduit system of an electric railway, and has for its object the provision of a simple, safe, and economical organization of the class designated.

To attain the desired end my invention consists in the construction, arrangement and operation of parts herein set forth.

For a full and exact understanding of my invention reference is had to the accompanying drawings, which form a part of this specification, and in which—

Figure 1 represents a side elevation of my junction-box and movable portion of collector. Fig. 2 is a transverse section of the same on the line 2 2, Fig. 1, and Fig. 3 is a front elevation of my sectional conductor with the box located near each end of a section.

Like letters of reference indicate like parts in all the views.

My junction box serves to afford a means of making a contact between the conductor line as B, and a movable part electrically connected with or forming a movable portion of a service conductor, as B', the said box C being provided with a flexible elastic diaphragm $C^2$ and the parts being securely held together as by a band $C^3$. At the bottom of the box C is placed an insulated contact plate $C^4$ resting on a preferably flexible insulating plate $C^{40}$, the same serving as an insulating and water tight joint, by means of the washer $C^7$ and nut $C^8$ and being connected with the line conductor B through the fusible strip $B^3$, and normally a distance above the same there is a preferably claw shaped contact $C^{15}$ of the plunger $C^5$, having a washer $C^9$ soldered to the same end and a washer $C^{10}$ and nut $C^{11}$, the whole being supported by the diaphragm $C^2$ and guided by the blocks $C^6$ $C^{20}$.

By means of my air tight junction box, the air within the same is compressed upon the depression or inward movement of the plunger $C^5$, and an air cushion is formed which serves a three fold purpose: first, to raise the said contact plunger $C^5$; second, to exclude dampness and to maintain a dry condition, thus preventing any corrosion of the contact points, and, third, to blow out any sparks at the said contact points that may accidentally occur between the preferably claw shaped brushes of the contact plunger $C^5$ and contact plate $C^4$. I thus provide an air tight junction joint between the diaphragm $C^2$ and conductor B', which is supported by the said contact plunger $C^5$; and also an air tight joint between the contact plate $C^4$ and the line conductor B. I also provide an air tight as well as a water tight joint between the diaphragm $C^2$, and the junction box C, the said flexible air tight joint consisting of a yielding packing or other material (in this instance the lower edge of the elastic top $C^2$) which flexible means is ordinarily compressed and tightly held by suitable fastening means to the outer walls of the junction box, and preferably below the annular lip or flange of the same as in the present instance, by means of the band $C^3$, the ends of which may be screwed together in a rigid, secure manner.

The junction boxes C are secured to and support preferably in a vertical relation, the movable service conductor B', which is depressed by the passage thereover of collecting means, as a wheel E carried by a motor car. (Not shown). The consequent downward movement of the diaphragm $C^2$, causes a compression and agitation of the air contained within the entire air tight vessel C, and the said movement of the air caused by the passage of a car maintains the air within the said chamber C in an absolutely dry condition, and as no dampness can enter the vessel C from without, no corrosion of the contact points can occur.

By the movement of parts above described, a current of air is caused to pass between the contacts and at every said actuation of the diaphragm $C^2$ by a car, the fanning of the air, at the said contact points, so caused, will serve to blow out any sparks, should the same by any accident be formed within the junction box C.

It is manifest that various omissions of some particulars could be made without materially affecting the essential features of my invention or the operation of the remaining parts, and I do not therefore wish to be limited to the specific structural details of the organization herein set forth. Obviously the elements of the structure described may be located at an angle to the plane in which they are shown, or they may be inverted if desired. I accordingly use the words "side," "bottom," "vertical" and the like in a relative sense.

As it is evident that many changes in the construction and relative arrangement of parts might be resorted to without departing from the spirit and scope of my invention, I would have it understood that I do not restrict myself to the particular construction and arrangement of parts shown and described, but that I reserve the right to make such changes, and that

What I claim as new, and desire to secure by Letters Patent, is—

1. In combination, a series of junction boxes each consisting of (a) a rigid wall or casing, and (b) a movable portion as a diaphragm constructed and arranged to support a service conductor, and (c) an intermediate air-tight flexible joint; and a superimposed sectional bar service conductor; one box being located near each end of a section of said working conductor and arranged to hold in normal position or support the same.

2. In combination, a series of junction boxes each consisting of (a) a rigid wall or casing, and (b) a movable portion as a diaphragm constructed and arranged to support a service conductor, and (c) an intermediate air-tight flexible joint; and a superimposed sectional bar service conductor; one box being located near each end of a section of said working conductor and arranged to hold in normal position or support the same, and also collecting means constructed and arranged to engage with and to move the said sectional conductor toward the said box.

3. In combination, a series of junction boxes each consisting of (a) a rigid wall or casing, and (b) a movable portion as a diaphragm constructed and arranged to support a contact and service conductor, and (c) an intermediate air-tight flexible joint, said boxes inclosing contacts connected with conductors passing through the walls of said box and respectively leading to a feed wire and said service conductor, and a superimposed sectional bar service conductor; one box being located near each end of a section of said working conductor and arranged to hold in normal position or support the same.

4. In combination, a series of junction boxes each consisting of (a) a rigid wall or casing, and (b) a movable portion as a diaphragm constructed and arranged to support a contact and a service conductor, and (c) an intermediate air-tight flexible joint; said boxes inclosing contacts connected with conductors passing through the walls of said box and respectively leading to a feed wire and said service conductor, and a superimposed sectional bar service conductor, one box being located near each end of a section of said working conductor and arranged to hold in normal position or support the same, and also collecting means constructed and arranged to engage with and to move the said sectional conductor toward the said box.

5. In a water tight closed and relatively stationary junction box, inclosing contacts connected with conductors passing through the walls of said box, and respectively leading to a feed wire and service conductor, a contact plunger, provided with a washer soldered to the same, a flexible diaphragm secured to the box by means of an air tight flexible joint, entirely surrounding the same and a nut and washer by means of which the diaphragm and plunger are fastened together in an air tight relation.

6. In combination, a series of junction boxes each consisting of (a) a rigid wall or casing, and (b) a movable portion as a diaphragm constructed and arranged to support a service conductor, and (c) an intermediate air-tight flexible joint; and a superimposed sectional bar service conductor; one box being located near each end of a section of said working conductor and arranged to hold in normal position or support the same, and also a friction contact, and a stationary contact and an additional air-tight joint whereby the stationary contact is secured to the said junction box.

7. In a water tight closed and relatively stationary junction box, inclosing contacts connected with conductors passing through the walls of said box, and respectively leading to a feed wire and service conductor, a contact plate held against the same by a washer and nut, an intermediate insulating plate, and a contact plunger sustained by means of a movable diaphragm secured to said box by means of an air tight flexible joint entirely surrounding the same, whereby an interior pressure and current of air are automatically created by the passage of a car, and the parts thereby returned to their normal position.

In testimony of the foregoing specification I do hereby sign the same, in the city of New York, county and State of New York, this 20th day of April, A. D. 1894.

WILLIAM LAWRENCE.

Witnesses:
J. ODELL FOWLER, Jr.
ALFRED E. SMITH, Jr.